Dec. 27, 1927.

R. McTAVISH 1,654,506

METHOD OF RENDERING FAT BEARING ANIMAL MATERIAL

Filed Oct. 25, 1926

INVENTOR.

Robert McTavish,

Dec. 27, 1927.
R. McTAVISH
1,654,506
METHOD OF RENDERING FAT BEARING ANIMAL MATERIAL
Filed Oct. 25, 1926
2 Sheets-Sheet 2

Patented Dec. 27, 1927.

1,654,506

UNITED STATES PATENT OFFICE.

ROBERT McTAVISH, OF CHICAGO, ILLINOIS, ASSIGNOR TO THE CINCINNATI BUTCHERS' SUPPLY COMPANY, OF CINCINNATI, OHIO, A CORPORATION OF OHIO.

METHOD OF RENDERING FAT-BEARING ANIMAL MATERIAL.

Application filed October 25, 1926. Serial No. 143,947.

It is the object of my invention to provide new and useful improvements in method of rendering animal material containing fats. The term animal includes fish and the term fats includes oils within the purport and scope of my invention.

My invention is applicable for edible products and for inedible products.

It is an object of my invention to so treat the materials that the rendered product, namely the lard, grease, tallow, oil and other fats, shall be of good color, and off-color or tinging with color be minimized or avoided; further, to produce a product which is white or as white as the natural color will permit; and, further, to reduce or minimize carbonization in the rendered product.

It is a further object of my invention to provide a simple method readily controllable, and steps which have pronounced indicia, by which their desired beginnings, continuations and terminations may be readily indicated.

By dry heat hereinafter mentioned is meant any heat agency which does not have direct contact with the material, for instance steam in the jacket of a jacketed container.

It is a further object of my invention to render the animal material at substantially as low temperatures as will practically separate the fats from the residue, whereby likelihood of discoloration of the material is minimized, formation of free fatty acids is prevented or minimized, and a residue is obtained which, when produced either for human or animal food, has a high content of protein, and when produced for use as a fertilizer is rich in ammonia.

It is a further object of my invention, as a first stage, to subject the material being rendered to dry heat while the material is being agitated, and thereby causing gradual diffusion of heat throughout the mass of the material, and permitting substantially free escape of steam therefrom, and causing envelopment of the material in a blanket of steam, until the mass of the material attains a substantially uniform temperature of substantially 212 degrees Fahrenheit, or thereabout, advisedly in a range of 205° F. to 212° F., and by such escape of steam to cause evaporation of moisture content of the material until the moisture content of the solid residue of the material is in a range of from 12 to 15 per cent; whereupon, as a second stage, the escape of steam is retarded, (but preferably not discontinued), so as to cause pressure upon material being rendered by the steam generated from the remaining moisture content therein, causing envelopment of the material in a blanket of steam under pressure, the pressure upon the material being preferably a selected pressure in a range of 3 to 14 pounds per square inch, although I do not wish to be limited to such last-named pressures, also preferably reducing the temperature of the applied dry heat, not lower, however, than is necessary to produce the selected pressure upon the material.

This cooking under pressure continues until the steam, thus generated from the material, is insufficient, due to loss by escape of steam, to maintain said selected pressure upon the material, or until there is a substantial interruption in the continuity of such escape of steam, or until there is a pronounced rise in temperature of the material while maintaining the applied dry heat at substantially even temperature; and thereupon, as a third stage, materially reducing the temperature of the applied dry heat, and preferably shutting off the same, and, while the mass of the material is at a temperature above the boiling point of water in atmosphere, releasing the pressure from the material being rendered for causing the expelling of moisture therefrom, so as to substantially dry the material.

An advantage in my improved method, when it is desired to treat fresh materials, is that the materials to be treated may be operated on immediately they are separated from the hogs, cattle or other carcasses, immediately after being killed, and while still fresh, and that the rendered products may be obtained before any putrefaction or deleterious condition is present in the material treated, the materials being treated may also include chilled or refrigerated materials.

It is desirable although not essential in employing my improved method that the material to be treated, be reduced to particles, as by cutting the fatty and meaty particles to small pieces of say two to fifty cubic inches, or thereabouts, hashing the intestines, and by crushing the bones, so that the heat may readily permeate the same, and that the pores, cells and sacs thereof may be readily freed of their fatty contents, and that it be kept clean or that it be thoroughly cleaned, the extent of cutting, crushing, shredding and hashing depending on the character of the material and the speed of the rendering desired. The material may be if desired be placed in the cooker in as large chunks as the opening in the cooker will permit.

A further feature of my invention is that I control the heating of the material being treated in such manner with relation to its subjection to steam as to cause proper liquifying of the fats at comparatively low temperatures with substantially no discoloration due to carbonization in such manner that the edible properties of the edible products are retained or advanced in high degree; and that the inedible products, for instance, the rendered grease used in the manufacture of soap and in other industries, are of light natural color for enhancing the value thereof, and that the residue, which I shall also term cracklings, remaining after the extraction of the fats, has a high ammonia content or is rich in proteins, for enhancing its commercial value.

By employment of my improved method, further, the ammonia content or percentage of proteins is increased in the residue over methods heretofore employed; further, a cleaner and more healthful product is produced; further, offensive odors during the process of rendering are reduced or avoided; further, time is saved in rendering as preferably all of the moisture above a selected percentage is evaporated prior to subjecting the material to pressure; and, further, the production of free fatty acids is reduced or prevented.

My present invention is an elaboration on the invention shown, described and claimed in my copending application for patent on improvements in method of rendering, filed in the United States Patent Office March 18, 1924, as Serial No. 700,140, and my present application is a continuation in part of my said copending application.

In performing my improved method it is desirable to separate the materials according to grade, so that materials of different grades may be separately rendered. These materials contain different proportions of natural moisture, of fat, and of solids, such as meat fiber and tissue structures, depending upon the animal and the part of the animal from which the material is obtained, and also whether the same is adapted for edible material or inedible material. Much of the material is also washed, which adds moisture to the mass.

The highest grade of material is leaf lard and similar material from which edible fats and edible cracklings fit for human consumption are obtained.

A second grade of materials may be instanced as killing fats and cutting fats, the former taken from the carcass on the killing floor during the process of evisceration, and the latter taken off the carcass on the cutting floor, as is well understood by those skilled in the art. These materials usually comprise caul fats, ham facings, ruffle fats, back fats, ham shoulder and belly trimmings, ham skins and the like. Edible fats and edible cracklings may also be obtained from this material, as well as edible cracklings, and residue fit for animal food.

A third grade of materials may include so-called shop fats, market scraps and the like including varying amounts of bone. Edible and inedible fats and residue are obtained from this class of material.

A fourth grade of material may include inedible fats, such as beef offal, hog offal and other usual packing house offal, including black guts, tripes and the like, from which inedible fats and inedible cracklings fit either for animal food or for fertilizer are obtained.

A fifth grade of such materials may include dead animals and condemed carcasses, from which inedible fats and inedible cracklings, or residue mostly available for fertilizer, are obtained.

These various grades of material contain various amounts of natural moisture, various amounts of fats, and various amounts of solids, such as meat fibers and tissue structures and bones. Most of the materials except those instanced as the first grade and part of the second grade, and especially black guts, offal and the like, are also washed with water, to remove the blood and dirt and foreign matter, so as to provide a clean product to be rendered. Moisture is thereby added to the mass in addition to the natural moisture contents of the same. The moisture so added may be termed free moisture or added moisture.

My invention takes into consideration primarily the moisture content of the material, and the steps thereof are controlled by the moisture content, and the evidences of the presence of moisture hereinafter more fully explained.

It may be stated as an example that the natural moisture content of the first grade of material above mentioned may range from 4 to 10 per cent; that of the second grade from 5 to 25 per cent; that of the third grade from 15 to 50 per cent; that of the fourth grade from 40 to 75 per cent; and that of the fifth grade from 40 to 60 per cent; and that when the materials are washed, the moisture adhering to the material is to be added to the natural moisture content of the material. This added moisture may amount to an additional 5 to 20 per cent of the whole moisture content of the material.

The fat contents of the respective grades of materials mentioned may range respectively from 80 to 93 per cent; from 60 to 70 per cent; from 20 to 50 per cent; from 5 to 30 per cent; and from 20 to 35 per cent.

It may be further instanced that the percentage of solids, such as meat fibers and tissue structures, including bones where present, in such respective grades may be instanced as ranging respectively from 2 to 5 per cent of the total; from 4 to 15 per cent of the total; from 25 to 40 per cent of the total; from 5 to 15 per cent of the total; and from 30 to 60 per cent of the total, it being understood that the first two grades mentioned do not usually include bones.

The bone content of the mass is, by my improved method disintegrated into a water soluble condition available for absorption as a stock food when so employed or by plant life when employed as a fertilizer.

The fat content, the natural moisture content, the meat fiber and tissue structure content as well as the bone content in materials of this kind are readily ascertainable or discernible by those skilled in the art.

In carrying out my improved method I introduced the materials, whether of the class of edible material or of the class of inedible material, and irrespective of the grades of such respective classes, into a suitable cooker, and cook the same in manner to be hereinafter described.

I illustrate such a cooker in the drawings, but I do not herein claim the apparatus herein shown and described, having shown, described and claimed the same in a copending application for patent on improvements in rendering apparatus, Serial No. 78,651, filed December 31, 1925.

Figures 1, 3, 4, 5, 6, 7:
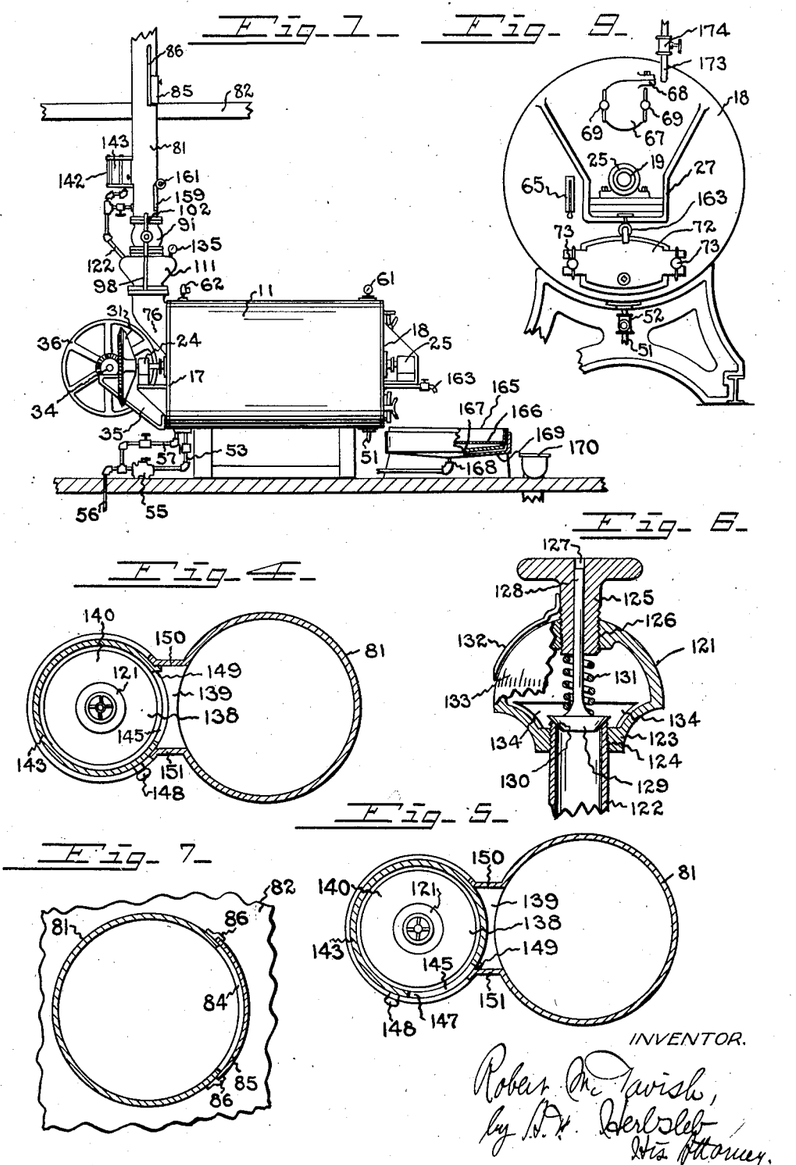
Fig. 1 represents a side elevation of an exemplifying apparatus which may be employed in performing my method, the view showing portions thereof in section.
Fig. 3 is a detail in vertical section taken on the line 3—3 of Fig. 2.
Fig. 4 is a horizontal cross-section, taken on the line 4—4 of Fig. 2, showing the pressure-relief means open to the stack.
Fig. 5 is a view similar to Fig. 4, showing the pressure relief means closed to the stack.
Fig. 6 is a vertical section of the relief valve, taken on the line 6—6 of Fig. 2, and partly in side elevation.
Fig. 7 is a detail of the stack and charging gate, taken on the line 7—7 of Fig. 2.
Figures 2, 3, 8:
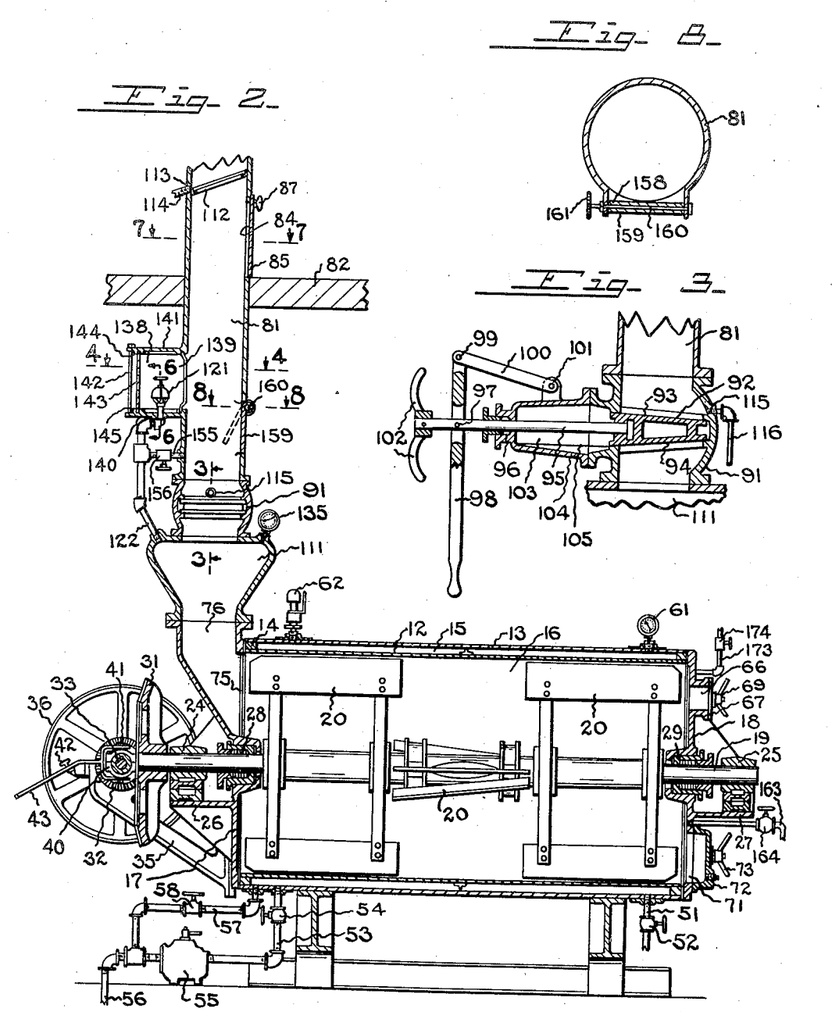
Fig. 2 is a vertical axial section of my improved apparatus.
Fig. 8 is a horizontal section of a detail showing the deflecting shutter, taken on the line 8—8 of Fig. 2; and, Fig. 9 is an end elevation of the cooker.

Referring now to an exemplification of apparatus employable in connection with my improved method, it may be stated that I prefer to employ a cooker, such as exemplified at 11, comprising an inner shell 12, and an outer shell 13, separated by spacing blocks 14, for forming a heating space 15, for the cooking compartment 16 into which the material to be treated is placed.

The cooker also comprises end walls 17, 18. A shaft 19 passes through the cooker and has stirrer-paddles 20, thereon, which are arranged to agitate the material and to move the same about in the interior of the cooker for uniformly heating the same, and for maintaining the same in divided form for proper heat permeation, and proper freeing of the rendered product.

The shaft is journaled in suitable bearings 24, 25, exemplified as on brackets 26, 27, on the end walls, the shaft also passing through suitable packings 28, 29, in the end walls for preventing the passage of contents of the cooker along the shaft to outside the cooker.

Suitable means are provided for driving the shaft, shown comprising a bevel-gear 31, secured to the shaft 19, driven by a bevel-pinion 32, on a shaft 33, journaled in bearings 34 of a bracket 35, the shaft 33 being driven by a suitable rotating member, as a pulley 36. A clutch comprising a clutch-collar 40, operated by a fork 41, pivoted on a bolt 42, secured to the bracket 35, and having a handle 43, is arranged between the bevel-pinion and the shaft for clutching the bevel-pinion and shaft together for driving the stirrer-blades in the cooker, or releasing their driving connection.

The heating jacket of the cooker has suitable connection with the heating agency, for instance, steam, by means of a steam-pipe 51, comprising a suitable valve 52, for regulating or shutting off the steam from said heating jacket. A discharge-pipe 53 communicates with the heating jacket, and has therein a valve 54, for regulating the discharge of heat and pressure from said heating jacket.

The discharge pipe communicates with a suitable steam-trap 55. A waste pipe 56 extends from the steam-trap. In order to provide prompt exhaust from the heating jacket 15 of the cooker, when desired, a by-pass pipe 57 connects with said jacket and by-passes the steam-trap, connecting with the waste-pipe. This by-pass pipe has a valve 58 therein.

The steam jacket also has a pressure-gauge 61 communicating therewith to indicate the pressure in the steam-jacket. A safety valve 62 also communicates with said steam-jacket.

The cooking compartment of the cooker preferably has a thermometer 65 communicating therewith, on which the heat of the contents of the cooker may be read.

The end wall 18 of the cooker may be provided with an observation opening 66, closed by a cap 67, hinged by a hinge 68 to the end wall, and clamped to the wall of said opening by clamps 69 to securely close the same.

The end wall 18 is also provided with a discharge opening 71, closed by a door 72, arranged to be clamped to the wall of said openings by means of clamps 73.

The wall 17 of the cooker is provided with a charging opening 75, with which a charging mouth 76 communicates, the charging mouth being shown as part of the wall 17.

The means for charging the cooker preferably comprises a stack 81, which may be of suitable height, and preferably extends to the outside of the building in which the cooker is contained so as to serve as a vent through which the steam and odors of the cooking may pass readily from the cooker and be discharged into the outside atmosphere. It is shown as extending through the floor 82, above the cooker, exemplified as the charging floor, and is shown broken away at the top, and may extend upwardly through other floors and the roof of the building in which the cooker is located.

If desired a suitable jet condenser may be connected with the stack for drawing off any offensive odors there may be from the material being cooked, and charging the same through a body of water for rendering the vapors unoffensive, as will be readily understood by those skilled in the art, and a description thereof is not herein deemed to be necessary.

Whatever offensive odors there may be in the cooking or whatever gases may be developed are discharged with the steam and other vapors during the first part of the cooking at atmospheric pressure, and a condenser need be employed or connected only when rendering such grades of material as produce odors which are offensive.

The material to be treated in the cooker, preferably after being washed, and suitably cut, crushed or hashed, but not necessarily so, is passed through an opening 84 in the stack, the opening being readily closed by a charging door 85, exemplified as slidable in guideways 86 at the respective sides of the opening, and having a handle 87 for controlling the same.

The material passed through the charging opening is conducted through the mouth of the cooker for being treated in the cooker.

The stack preferably has a valve 91 therein, arranged for closing or substantially closing the cooker, this valve being shown as a gate-valve, comprising a gate 92 coacting with valve-seats 93, 94, and having a stem 95 extending therefrom, passing through a suitable packing 96. The outer end of the stem has articulation 97 with a lever handle 98 articulated at 99 with a link 100 pivoted at 101 to the valve-casing. The outer end of the stem may be also be provided with handles 102. The valve may be operated by the lever or the latter handles. The valve 92 is arranged to be received in a cavity 103 of the valve casing 104 when the valve is retracted, and may be guided on ways 105 at the respective sides of the valve casing.

A steam chamber 111 is preferably located between the valve and the mouth of the cooker, shown as an enlargement of the stack. Its purpose is to provide a space in which ebullition of the contents of the cooker may take place, and provides a collecting chamber to avoid cooking over of such contents.

The steam from the cooker passes up the stack. Portions of it may condense upon the inner surfaces of the wall of the stack. In order to avoid the passage of such condensation back into the cooker, I prefer to provide a grooved ring-flange 112 about the interior of said wall above the opening 84, to receive such condensation and to conduct it by means of an opening 113 and a pipe 114 outside the stack.

I prefer to form an opening 115 above the valve 91, so that any condensation which may accumulate above said valve during closed condition of the valve is discharged through said opening and a waste pipe 116, so that, when the valve is opened, after a period of closure thereof, water or condensation may not drop into the cooker.

When the valve 91 is open, the interior of the cooker is open to the atmosphere, so that the steam arising from the boiling of the water in the material in the cooker will pass freely to the atmosphere.

As hereinbefore indicated, the material in the cooker is preferably subjected to pressure due to the cooking during a portion of the cooking. I provide means for relieving this pressure, and continuing evaporation from the cooker during such pressure condition therein, exemplified as comprising a relief-valve 121, shown as having communication with the collecting chamber 111, by means of a pipe 122. The relief-valve may comprise a body 123 screwed to the end of the pipe 122, as by threaded connection 124, and having thereon an adjusting handle 125, having threaded connection 126 with said body, and provided with a bore 127 in which a stem 128 of a valve 129 is slidable. The valve 129 is arranged to coact with the valve-seat 130 at the end of the pipe.

A spring 131 is interposed between the valve and the handle, the adjustment of the handle determining the resistance of the spring. The handle is provided with a finger 132 coacting with a gauge 133 on the body of the valve, whereby to read the resistance pressure of the valve. The body of the valve is provided with relief openings 134.

Means are provided for ascertaining the pressure inside the cooking compartment, as by providing a pressure gauge 135, which has communication with the collecting chamber 111, by being secured in the wall thereof.

The relief-valve is preferably placed in a compartment 138 having a passage 139 communicating with the stack or vent.

The object of placing the relief-valve in communication with the stack is to permit the exhaust therefrom to be drawn off into the stack. The relief-valve is preferably placed in a compartment at the side of the stack so that the same will not obstruct the material fed through the stack into the cooker. The compartment is preferably so arranged that the exhaust may be seen and smelt when desired in order to test the state of the cooking and of the material being cooked in the cooker.

The compartment preferably comprises a casing, having a lower wall 140, an upper wall 141, spaced by tie-rods 142 and having a cylindrical side wall 143, rotatable in grooves 144, 145, respectively on the inner faces of the upper and lower walls.

The cylindrical wall is provided with an opening 147 and with a handle 148. One wall of the opening is provided with a lug 149 arranged to be alternately arrested by the side walls 150, 151, of the passage 139 between the compartment and the stack. The cylindrical wall forms a door which, when moved to the left, causes the passage to the stack to be closed and the opening in the wall to be at the outside of said passage, so that the relief valve may be viewed from the outside, and so that the exhaust therefrom may also be discharged into the room in which the cooker and the operator are located, so that the operator may observe and may also smell the exhaust in order to judge the state of the cooking and of the material being cooked. After such observation the door may be closed by turning the cylinder to the right, which will close the outside of the casing and place the opening of the cylindrical wall in registry with the passage to the stack.

There is also preferably a by-pass pipe 155 between the cooker and the stack beyond the closure-valve 91. It is shown connecting with the pipe of the relief-valve, and with the stack above the closing valve. The pipe 155 has a valve 156 therein. When this valve is open there is communication from the cooker to the stack, by-passing the closing valve 91. It is normally closed during pressure condition in the cooking compartment.

The condition of the contents of the cooker may also be tested by the appearance and odor of the steam passing therefrom, for which purpose I provide an opening 158 in the stack, arranged to be closed by a shutter 159, hinged to the wall of the stack by a hinge 160, operated by a wheel 161, and so arranged as to swing into the stack, whereby to deflect steam from the cooker passing through the stack so that the same may be seen and smelt by the operator.

A drain-pipe 163 having a valve 164 therein is provided, through which contents of the cooker may be discharged for testing the contents. The liquid contents of the cooker may be discharged through this drain-cock after the cooking. The valve 164 is normally closed.

A live-steam pipe 173 having a valve 174 therein may communicate with the interior of the cooking compartment, as a precautionary measure for supplying moisture in said cooking compartment.

The contents of the cooker may, if desired, be discharged into a draining device 165 which has therein a sieve 166 for arresting the cracklings, the rendered lard, grease or tallow passing through the sieve into a chamber 167 under the sieve or strainer, and being discharged through a pipe 168 for suitable storage, packing or other treatment, as may be desired. The draining device may have a steam jacketed space 169 for maintaining the contents of the draining device at desired temperature for fluidity of the rendered product.

The cracklings which remain in the draining device above the sieve or strainer are removed into a trough 170, from which they pass to a suitable expeller for expelling any remaining lard, grease or tallow in the cracklings to desired extent, or for other operations, as may be desired.

Having described an exemplification of an apparatus which may be employed in the performance of my improved method, I shall now describe my improved method more in detail.

The material before being charged into the cooker is preferably cut, crushed, reduced or hashed in suitable manner, although the material may be charged into the cooker in as large pieces as will pass through the charging opening into the cooker, and steam is charged into the heating space and the stirrer-blades are rotated.

Three series of these stirrer-blades are shown, arranged lengthwise in the cooking space. Each of the series may contain two blades 180 degrees apart and the same may be instanced as rotating at a speed of 18 revolutions per minute. The cooker may be instanced as four feet in diameter and seven feet long, and capable of a charge of about 3000 pounds of material, filling about one-half the space in the material compartment. During charging of the cooker, which usually occupies from 10 to 15 minutes, the steam in the heating jacket is preferably at a pressure of 10 pounds per square inch.

When the charging of the cooker has been completed, the pressure of the steam in the heating jacket is gradually increased during a period for a range of from 10 to 15 minutes until the pressure in the heating jacket or steam space preferably amounts to 40 pounds per square inch, equal to an applied heat of 280° Fahrenheit, although an applied pressure of 45 pounds per square inch equal to an applied heat of 292° Fahrenheit is not inadvisable.

The pressures herein mentioned are pounds per square inch as measured on a usual pressure gage.

In practice the materials may be charged into the cooker immediately after they are separated from the animal carcasses, immediately after the animals are killed, or such materials, especially of edible properties, may have been chilled by having been stored in a suitable refrigerator, and may be charged into the cooker in chilled condition.

The material in the cooker contains the natural moisture in the material when charged into the cooker and also contains added moisture if the same has been previously washed.

The steam generated in the material is permitted to pass off of the same. The gases, odors and vapors pass off during the first part of this stage of the cooking and, if noxious, are condensed for the purposes of preventing diffusion in the atmosphere of noxious odors from the cooking. The valve 91 is preferably open during this period of the cooking, the material being preferably at substantially atmospheric presure. Heat from the shell of the cooker is transmitted to the material which is at the same time continuously stirred by the stirrers in the cooker. The film of material which contacts the said shell is by the stirrers continuously moved up and drops away from the shell, to be followed by other films of material in such contact, whereby steam is generated from the material and the contacted film of material reintroduced into the mass of the material for cooling the same and transmitting heat to such mass.

There is a continuous escape of steam and a gradual absorption of heat by the mass of the material until the mass or bulk of the material has a temperature imparted thereto in a range of 205° Fahrenheit to substantially the boiling point of water, namely, 212° Fahrenheit. The moisture in the material, thus converted into steam, envelops the material, which is surrounded by a blanket of steam throughout the cooking for preventing carbonization of the material.

This stage of the cooking at atmospheric pressure preferably continues until the mass of the material has attained a temperature preferably in a range of 205° to 212° Fahrenheit, and advisedly of 212° Fahrenheit, and preferably, the moisture content of the solid residue of the mass of material is reduced to approximately 15 per cent and preferably of a range of from 12 to 15 per cent. The moisture content of the solid residue is determined by draining the free fats from the solids of material discharged from the cooker through the discharge openings thereof and obtaining the percentages without removing the remaining fats from the solid residue. There is preferably no pressure above atmospheric pressure on the material during this first stage of the cooking, the steam being permitted to escape freely.

This stage of the cooking may be termed the first stage, and is continued throughout a duration of time determined by the amount of moisture in the material and the heat applied in the heating jacket. This stage of the cooking, when treating materials of the third grade, fourth grade, and fifth grade, above mentioned, may continue throughout a period ranging from 20 minutes to one hour and thirty minutes, as an example, but not as a limitation. It usually continues from 50 to 90 minutes. When treating materials of the first class above mentioned this first stage may be very short, in fact, the cooker may be closed, as by closing the valve 91, practically immediately after the charging of the cooker has been completed, owing to the small amount of moisture in such material, and when rendering material of the second grade above mentioned, the cooker may be closed within a range of from 5 to 20 minutes after the completion of the charging of the cooker.

These times vary according to the amount of moisture in the mass of material and the heat applied. The temperature of the material at the end of the first stage of the cooking is determined by observing the heat registered on the thermometer 65, the bulb of which communicates with the interior of the cooker and is subjected to the heat which is in the material in the cooker, as by contact therewith by said material through a suitable perforate protecting casing about said bulb, as will be understood by those skilled in the art.

It may be here stated that during the first stage of the cooking, there is ready liberation of moisture in the form of steam, and that toward the end of said first stage as hereinbefore explained, the amount of moisture in the material may be instanced as a moisture content remaining in the solids of the material in a range of from 12 to 15 per cent, whereupon the temperature of the material under atmospheric pressure has a tendency to rise above 212° Fahrenheit.

As soon as this critical point has been reached it is advisable to reduce the temperature of the heating agency quickly and also to close the cooking compartment, so that the conversion into steam of remaining moisture in the material produces a pressure upon the material, and provides a protecting blanket of steam about the material, which is a continuation of the blanket of steam at substantially atmospheric pressure during the first stage of the cooking, which prevents carbonization of the material. The reduction of temperature of the heating temperature is not below that necessary to maintain the stated pressure upon the material.

In order to test the odor of the steam being discharged from the cooker during the first stage of the cooking, the stack may be provided with a shutter 159 for diverting a portion of the steam to the outside of the stack convenient to the operator, so that the amount of steam and the odor may be tested.

Immediately that the thermometer registers a temperature of the material in the inside of the cooking compartment of 212° Fahrenheit, or, if desired, a given degree in the range of temperature of 205° to 212° Fahrenheit, when said cooking compartment is at atmospheric pressure, and preferably, the moisture content of the solids has been reduced to a range of from 12 to 15 per cent, the first stage of the cooking is completed and the second stage thereof begun. At this point the pressure in the heating jacket of the cooker is at once reduced, being preferably reduced, for instance, to approximately ten pounds per square inch, and advisedly in a range of 10 to 35 pounds per square inch, depending on the pressure it is desired to maintain in the cooking compartment and the speed of rendering desired.

The cooking compartment is also preferably substantially closed immediately at the end of the first period or stage of the cooking, as by closing the valve 91, so as to develop steam from the moisture in the material, which is retained in the cooking compartment, resulting in pressure upon the material generated from moisture contained in the material.

Samples of lard being rendered may be taken by opening the valve 164. This test also applies to a more limited extent in rendering grease and tallow.

Carbonization of the material is avoided by such reduction of the temperature of the heating agency and permitting pressure to develop on the material from the moisture therein at approximately the end of such first stage of the cooking, and preferably prior to any substantial rise in temperature of the material above 212° Fahrenheit, whereby the steam reacts upon the material as by enveloping the same in a blanket of steam.

If desired, a small quantity of live steam may be injected into the cooking compartment, by opening the valve 174, for preventing any quick rise in temperature of contents and consequent carbonization of the material. The amount of live steam injected is preferably small, just sufficient to avoid quick rise in temperature of the material. Water may be injected in place of the live steam.

The pressure and consequent temperature in the material compartment is also regulated by means of the relief valve 121 hereinbefore described. This relief valve is set to open at the desired pressure which it is preferred to have in the cooking compartment during the cooking, and the cooking is continued during what may be termed a second stage, which is a stage of cooking under pressure of steam generated from the moisture content of the material.

The relief valve permits escape of steam when a pressure has been developed in the cooking compartment equal to the number of pounds at which the relief valve is set. Such steam is developed from the moisture content of the material by contact of the material in a film against the inner wall of the heating shell, which film is stirred into and the heat thereof absorbed by the body of the material by the stirrers in the cooking compartment, such film being superseded by other films in contact with said inner wall, for gradually permeating the heat throughout the mass of the material. The steam thus developed creates pressure upon the material and when such pressure exceeds the pressure point at which the relief valve is set, the steam above such pressure escapes, for maintaining the pressure in the cooking compartment at the pressure at which the relief valve is adjusted.

The adjustment of the relief valve may be instanced as a pressure in a range of 3 to 5 pounds per square inch in the case of rendering materials of the first grade above mentioned; a pressure in a range of 5 to 10 pounds per spuare inch in the case of rendering materials of the second grade above mentioned; and a pressure in a range of ten to approximately fifteen pounds per square inch in the case of rendering grease and tallow, or materials of the third, fourth and fifth grades hereinbefore mentioned; or such latter pressure may if desired be as high as forty pounds, or even higher, depending on the amount and speed of disintegration desired in the material. The lower pressures are preferably employed and are especially applicable where the materials have been cut, crushed, shredded or hashed prior to introduction into the cooking compartment, as thereby disintegration is more readily effected, although the higher pressures in the range up to forty pounds may be employed if the materials, especially the bones have not been so cut, crushed, shredded or hashed, in order to thoroughly disintegrate the same. The pressure employed is, however, advisedly in a range of three to fourteen pounds per square inch, in my present preferred method, especially when cooking cut, crushed, reduced or hashed materials.

I prefer that the material may during this second stage of the cooking be permitted to rise to a sufficiently high degree of heat for a sufficient duration of time to sterilize the material, and preferably that the material acquire a saturated heat of 220° Fahrenheit throughout the mass of the material for a brief period of time, for the purpose of sterilization.

The material, during the second stage of the cooking, is advisedly permitted to rise to a temperature of 215° Fahrenheit, although I prefer that the temperature shall be greater than this, advisedly to approximately 230° Fahrenheit when rendering grease and tallow, and similar fats, and approximately 220° Fahrenheit when rendering lard, and similar fats.

I prefer to employ the higher temperatures of 220° Fahrenheit to 230° Fahrenheit mentioned for the second period of cooking, as thereby certain deleterious substances in the material, namely, gelatinous tissue and substances, are dissolved, and, having greater specific gravity than the rendered lard, settle, and become part of the cracklings, thereby producing a better lard.

During this second stage of cooking, when the pressure inside the material compartment exceeds the pressure at which the relief valve is set, namely in a range of 3 to 14 pounds per square inch, gradual relief of pressure through the relief valve takes place, which is continuous or interrupted according to the pressure which is generated in the material compartment. When, however, with such setting of the relief valve, the interruptions become extended, that is, when the relief puffs are not substantially continuous, or they substantially cease, the cooking is completed.

The duration of such cooking during the second stage may be in the neighborhood of two hours in the case of grease and tallow stocks, although the duration of the period is less in the case of lard stocks, in which case it is approximately in the neighborhood of one hour, and in the case of materials of the fourth and fifth grades, may continue throughout a period as long as three hours at the higher pressures referred to.

The cooking of the material is continued during this second stage preferably under the aforesaid lower pressure and temperature of heating agency and higher pressure and temperature of the material, compared with such pressures and temperatures respectively during the first stage of the cooking, as hereinbefore explained.

If danger of undesirable rise in temperature of material is perceived, live steam or water may be injected through the pipe 173 to prevent carbonization of the rendered product and of the cracklings.

The heat is shut off at the termination of the second stage of the cooking by closing the intake valve 52 of the intake steam-pipe 51, and, if desired, by opening the by-pass valve 58 past the steam-trap for relieving the heating space of the cooker from all pressure; and the material compartment of the cooker is thereupon opened to outside atmosphere, preferably accomplished by opening the by-pass valve 156 to permit relief of pressure in the cooking compartment, which escapes through the stack, and when such pressure has been sufficiently relieved, the closing valve 91 is opened. This is the third step of my improved method.

When the pressure is released from the material compartment, the material being at a higher temperature than 212° F., and the material being open to atmosphere, all the moisture above the natural moisture in atmosphere, is driven out of the rendered material or fats, and all the moisture above a moisture content of 10 per cent is driven out of the residue which constitutes the cracklings or solids, by the presence of the higher temperature in the rendered material and residue, leaving a moisture content in the cracklings or residue in a range of 5 to 10 per cent, which I have found advisable for handling and expressing the remaining fats from said cracklings. The material is thereby dried.

It is advisable to leave the material in the cooking compartment for some ten or fifteen minutes after the heat has been shut off and pressure removed, for a preliminary settling of the residue, the rotation of the paddles 20 having been stopped, after which a draining valve 164 for the rendered product may be opened to drain off the liquid fats or rendered product, which is at the top, and conduct it to a suitable point, and the balance of the material may be dumped through the discharge opening 71 into the draining device 165, where separation of the rendered product from the cracklings continues. The dumping may be aided by again rotating the stirrers for directing the material toward the discharge opening of the cooker. The respective products may be subjected to further treatments or storage or packing, as may be desired.

I do not herein claim the broad invention herein shown and described, having shown, described and claimed the same and a species thereof in my aforesaid copending application Serial No. 700,140, but what I claim in this application is the species of said invention herein more particularly shown and described, this separation of the claims to

Having thus fully described my invention, what I claim as new, and desire to secure by Letters Patent, is:

1. A method of rendering fat bearing animal material containing moisture, which comprises cooking said material by means of a dry heat while said material is being agitated and thereby causing gradual diffusion of heat throughout the mass of said material and while permitting substantially free escape of steam from said material until said mass attains a temperature in a range of 205° Fahrenheit to 212° Fahrenheit then retarding said escape of steam cooking the material at a higher temperature in the presence of steam under pressure in a range of from 3 to 14 pounds per square inch generated from the moisture content of the material while permitting escape of excess steam thus generated until such escape of excess steam substantially ceases, then discontinuing the cooking and releasing the said steam under pressure while the temperature of the material is above 212° Fahrenheit so as to substantially dry the latter, and separating the fats from the residue.

2. A method of rendering fat bearing animal material containing moisture, which comprises cooking said material by means of a dry heat while the material is being agitated and thereby causing gradual diffusion of heat throughout the mass of the material and while permitting substantially free escape of steam from said material until said mass attains a temperature in a range of from 205° Fahrenheit to 212° Fahrenheit and has the moisture content of its solid residue reduced to a range of from 12 to 15 per cent, then materially retarding said escape of steam and cooking said material at a higher temperature in the presence of steam under a given pressure in a range of from 3 to 14 pounds per square inch generated from moisture content of the material while permitting escape of the excess steam until such escape of the excess steam substantially ceases at said given pressure, then discontinuing the cooking and releasing said steam under pressure while the temperature of the material is above 212° Fahrenheit, and separating the fats from the residue.

3. A method of rendering fat bearing animal material containing moisture, which comprises cooking said material by means of a dry heat while said material is being agitated and thereby causing gradual diffusion of heat throughout the mass of said material and while permitting substantially free escape of steam from said material until said mass attains a temperature of approximately 212° Fahrenheit and has its moisture content reduced to a point at which the moisture content of the residue of said material is reduced to a range of from 12 to 15 per cent, then heating the material to a temperature of from 220° Fahrenheit to 248° Fahrenheit while retarding said escape of the steam and continuing the cooking of said material in the presence of steam under pressure generated from the moisture content of the material and at a given pressure in a range from substantially 3 to 14 pounds per square inch until such escape of the steam substantially ceases at said given pressure, then discontinuing the heating, releasing the said steam under pressure while the temperature of the material is above 212° Fahrenheit so as to substantially dry the latter, and separating the fats from the residue.

In testimony whereof, I have hereunto signed my name.

ROBERT McTAVISH.